US010565400B2

(12) United States Patent
Asokan et al.

(10) Patent No.: US 10,565,400 B2
(45) Date of Patent: *Feb. 18, 2020

(54) IMPLEMENTATION OF AN INTEGRITY-PROTECTED SECURE STORAGE

(71) Applicant: Nokia Technologies Oy, Espoo (FI)

(72) Inventors: Nadarajah Asokan, Espoo (FI); Jan-Erik Ekberg, Vantaa (FI); Lauri Paatero, Helsinki (FI)

(73) Assignee: Nokia Technologies Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/924,026

(22) Filed: Oct. 27, 2015

(65) Prior Publication Data
US 2016/0205075 A1    Jul. 14, 2016

Related U.S. Application Data

(63) Continuation of application No. 11/128,676, filed on May 13, 2005, now Pat. No. 9,171,187.

(51) Int. Cl.
*G06F 21/78* (2013.01)
*G06F 21/62* (2013.01)
*G06F 21/71* (2013.01)

(52) U.S. Cl.
CPC .............. *G06F 21/78* (2013.01); *G06F 21/62* (2013.01); *G06F 21/71* (2013.01)

(58) Field of Classification Search
None
See application file for complete search history.

(56) References Cited

U.S. PATENT DOCUMENTS

| 4,200,770 A | 4/1980 | Hellman et al. ............... 178/22 |
| 5,869,823 A | 2/1999 | Bublitz et al. |

(Continued)

FOREIGN PATENT DOCUMENTS

| DE | 102 47 794 A | 4/2004 |
| EP | 1043860 A2 | 10/2000 |

(Continued)

OTHER PUBLICATIONS

Diffie, W. et al., "New Directions in Cryptography", IEEE Transactions on Information Theory, vol. IT-22, No. 6, Nov. 1976, pp. 644-654.

(Continued)

*Primary Examiner* — Benjamin E Lanier
(74) *Attorney, Agent, or Firm* — Harrington & Smith

(57) ABSTRACT

An internal but not integrated security token is provided for a device which includes a first integrated circuitry including a secure processor. The security token is provided by a second integrated circuitry separate from the first circuitry. The second integrated circuitry includes a secure non-volatile storage. The secure processor communicates information to the second circuitry in a secure manner for the secure information to be securely stored in the secure non-volatile storage, and the second integrated circuitry communicates information stored in its secure non-volatile storage to the secure processor in a secure manner. Communications is secured by means of cryptography. The first integrated circuitry and the second integrated circuitry are internal parts of the device. An initialization method for distributing a secure key to be shared between the circuitries and to be used in cryptography is also disclosed.

18 Claims, 3 Drawing Sheets

(56) References Cited

U.S. PATENT DOCUMENTS

| | | | |
|---|---|---|---|
| 5,875,465 | A | 2/1999 | Kilpatrick et al. ............ 711/134 |
| 6,294,936 | B1* | 9/2001 | Clementi ................ H03C 3/095 |
| | | | 327/147 |
| 6,510,515 | B1 | 1/2003 | Raith ............................ 713/163 |
| 6,594,760 | B1 | 7/2003 | Ryan, Jr. et al. ............. 713/189 |
| 7,062,658 | B1* | 6/2006 | Cheriton .............. H04N 7/1675 |
| | | | 348/E5.004 |
| 2002/0108053 | A1 | 8/2002 | Kashiwada |
| 2003/0076957 | A1 | 4/2003 | Asokan et al. |
| 2003/0079122 | A1 | 4/2003 | Asokan et al. ................ 713/156 |
| 2003/0145203 | A1* | 7/2003 | Audebert ............. G06Q 20/341 |
| | | | 713/169 |
| 2004/0071097 | A1* | 4/2004 | Halter .................... H04L 12/403 |
| | | | 370/257 |
| 2004/0146163 | A1 | 7/2004 | Asokan et al. ................ 380/277 |
| 2004/0255145 | A1* | 12/2004 | Chow ................. G06F 12/1466 |
| | | | 726/16 |
| 2005/0125682 | A1* | 6/2005 | Eguchi .................. H04L 63/061 |
| | | | 713/189 |
| 2006/0098900 | A1* | 5/2006 | King ..................... G06F 21/606 |
| | | | 382/305 |
| 2006/0129848 | A1 | 6/2006 | Paksoy et al. ................ 713/193 |

FOREIGN PATENT DOCUMENTS

| | | |
|---|---|---|
| WO | WO-97/05551 A1 | 2/1997 |
| WO | WO-00/72500 A2 | 11/2000 |

OTHER PUBLICATIONS

Maheshwari, U. et al., "How to Build a Trusted Database System on Untrusted Storage", OSDI 2000, 16 pgs.

Menezes, A. J. et al., "Handbook of Applied Cryptography", ISBN: 0-8493-8523-7, Fifth Printing, Aug. 2001, pp. 228-230.

Atmel Crypto & Secure Memories, Retrieved, Jun. 1, 2005, from http://www.atmel.com/products/securemem, 2 pgs.

National Data Encryption Standard (DES) algorithm, National Institute of Standards and Technology, Federal Register, Mar. 17, 1975, vol. 40, No. 52 and Aug. 1, 1975, vol. 40, No. 149, 20 pgs.

Stallings, W., "Cryptography and Network Security", $2^{nd}$ Edition, Prentice Hall, 1999, Chapter 5.3, pp. 141-142.

William Stallings: Network Security Essentials, Applications and Standards: (section 2.5 including Fig. 2.10) 2002; in Russian (2 pages) and English translation thereof (2 pages).

\* cited by examiner

IMPLEMENTATION OF AN INTEGRITY-PROTECTED SECURE STORAGE

CROSS REFERENCE TO RELATED APPLICATION

This is a continuation patent application of U.S. patent application Ser. No. 11/128,676 filed on May 13, 2005.

FIELD OF THE INVENTION

The present invention relates to providing an integrity-protected secure storage for a device. Particularly, but not exclusively, it relates to state maintenance on a portable device such as a mobile telephone.

BACKGROUND OF THE INVENTION

The use of personal communication devices in various aspects of our daily lives has increased dramatically over recent years. Modern mobile telephones are becoming multipurpose devices capable of various new security applications, such as banking and digital rights management (DRM) clients. With the proliferation of personal communication devices, it has become more and more important to protect the critical data stored within the device. For example, the use of a PIN has been implemented with personal communication devices to control access to the device. However, it is possible that one may guess the PIN if given an unlimited number of time and attempts to enter a PIN. Thus, in addition to the use of a PIN, it is useful to limit the number of attempts to enter a PIN.

In order to limit the number of attempts to access the device, it is possible to use some type of counter in the personal communication device. The counter is cryptographically bound to state information related to the critical data used by the device and may be used as a theft-protection mechanism. In this context, the state information may mean information indicating the number of successive incorrect PIN access attempts. After a certain number (say three) of incorrect PIN entry attempts, the device locks up until a special PIN unblocking key (i.e., PUK code) is entered.

If the state information storage on the device lacks integrity-protection, it may be possible for an attacker to record the current state information, try three successive PINs (during which the device will update the state information), and overwrite the newly updated state information with the old recorded data. In this way, the attacker would get three more tries to find the correct PIN.

In addition to keeping track of successive incorrect password/PIN access attempts, there are various other uses in the area of DRM, in which the ability to securely store state information in a secure personal device may be needed.

Keeping track of a counter value can be useful also when controlling the consumption of data content is needed. For example, a third party might want to prevent a user of a personal communication device from playing a song more than ten times. The right to play the song ten times is delivered as an electronic voucher that specifies a 10-use restriction by implementing a counter. However, if a user can reset the counter after each use, the song can be played indefinitely without having to pay the owner of the data for each use.

In mobile devices, there are also device dependant security states which should be reliably accessible throughout the life time of the device. For instance, a mobile telephone may have a phone lock feature that effectively should prevent use of stolen phones. When the lock is engaged, an identifier of the present subscriber identity module (SIM) is stored in a rewriteable persistent memory of the phone with a suitable representation (for instance, a one-way hash-code) of a matching passcode. Whenever the SIM is replaced, if the phone protection is enabled, the phone first asks the user for the corresponding passcode and only if successfully entered, the phone stores the ID of the new SIM and allows its use. However, to prevent brute force attack, the phone should also maintain a counter of failed passcodes so that after three failed attempts, the phone becomes more thoroughly locked.

In the area of DRM, where non-volatile maintenance of critical state information has been needed, various methods of cryptography have been used to protect the critical state information, such as critical counter values, etc.

One aspect of cryptography involves the encoding or encrypting of digital data to render it incomprehensible by all but the intended recipients. In other words, when cryptography is employed in the context of DRM, the data is encrypted and a decryption key is delivered to those terminals or users that have paid to consume the data content. To this end, cryptographic systems can be used to preserve the privacy and integrity of the data by preventing the use and alteration of data by unauthorized parties. In addition to encryption, also authentication of the origin of the data is used in order to make sure that e.g., only a party who has the right key can generate the right signature or message authentication code (MAC).

For example, a plaintext message consisting of digitized sounds, letters and/or numbers can be encoded numerically and then encrypted using a complex mathematical algorithm that transforms the encoded message based on a given set of numbers or digits, also known as a cipher key. The cipher key is a sequence of data bits that may either be randomly chosen or have special mathematical properties, depending on the algorithm or cryptosystem used. Sophisticated cryptographic algorithms implemented on computers can transform and manipulate numbers that are hundreds or thousands of bits in length and can resist any known method of unauthorized decryption. There are two basic classes of cryptographic algorithms: symmetric key algorithms and asymmetric key algorithms.

Symmetric key algorithms use an identical cipher key for both encrypting by the sender of the communication and decrypting by the receiver of the communication. Symmetric key cryptosystems are built on the mutual trust of the two parties sharing the cipher key to use the cryptosystem to protect against distrusted third parties. A well-known symmetric key algorithm is the National Data Encryption Standard (DES) algorithm first published by the National Institute of Standards and Technology. See *Federal Register*, Mar. 17, 1975, Vol. 40, No. 52 and Aug. 1, 1975, Vol. 40, No. 149. The sending cryptographic device uses the DES algorithm to encrypt the message when loaded with the cipher key (a DES cipher key is 56 bits long) for that session of communication (the session key). The recipient cryptographic device uses an inverse of the DES algorithm to decrypt the encrypted message when loaded with the same cipher key as was used for encryption.

Asymmetric key algorithms use different cipher keys for encrypting and decrypting. In a cryptosystem using an asymmetric key algorithm, the user makes the encryption key public and keeps the decryption key private, and it is not feasible to derive the private decryption key from the public encryption key. Thus, anyone who knows the public key of a particular user could encrypt a message to that user, whereas only the user who is the owner of the Private key corresponding to that public key could decrypt the message. This public/private key system was first proposed in Diffie and Hellman, "*New Directions in Cryptography*," IEEE Transactions on Information Theory, November 1976, and in U.S. Pat. No. 4,200,770 (Hellman et al.).

The Cryptographic systems noted above have been used to protect state information in a personal communication device by securely storing the state information in a couple of ways. First, by writing a snapshot to the state information and computing its "checksum," e.g., by using a one-way hash function. The result is stored within a tamper-resistant memory location of the device. Therefore, if someone tries to change the state information, the checksum of the result will not match the checksum value stored within the personal device. Second, by using a monotonic, persistent counter within the device. Every time there is a state change, the state information is stored along with the current counter value encrypted using a device key. Thus, no one can change the encrypted state information without the key.

However, both of these prior-art methods require a small amount of read-write storage within the same tamper-resistant zone which contains the secure processor itself.

In the field of DRM, the involved applications are typically provided by digital integrated circuitry. If a secure processor running such applications has enough updatable space within its tamper-resistant persistent storage, it is rather easy to implement integrity protection for state information. Maheshwari et al. have disclosed such an arrangement in "*How to Build a Trusted Database System on Untrusted Storage*", OSDI 2000. Unfortunately, the economical reasons are eradicating the non-volatile rewriteable memories on digital integrated circuitries. Having an updatable memory, or read-write storage, integrated within the secure processor's tamper-resistant perimeter is expensive, especially on particularly resource-constrained devices like mobile phones. In other words, the storing of state information and secure processing of applications is not always economical (or not even practical) within the same tamper-resistant zone as the secure processor, for example, within the secure processor's integrated circuitry.

Furthermore, as is known in the art, the digital IC blocks tend to be cost optimised so that some of them even cannot accommodate a rewriteable persistent memory (e.g., flash memory), as inclusion of such would mandate manufacturing 6 silicon layers instead of the common 4 for the area of the IC block. Hence again, simply providing a secure processor with a non-volatile memory seems not economically and technically suitable for all uses.

Accordingly, there is a problem how to implement an integrity-protected secure storage for a secure processor of a generally resource-constrained device.

As a practical solution to this problem, a co-pending patent application of the applicants of the present application, publication number US 2003/0079122 A1, presents the idea of using an external tamper-resistant storage device to store important state information. The idea of authenticated (or "trusted") counters is introduced. The patent application US 2003/0079122 A1 discloses that an authenticated counter can be implemented in an external tamper-resistant security token, such as a smartcard, which can be used by the secure processor to integrity-protect its state storage. To make this work, the secure processor needs to be able to authenticate the external security token. For this purpose, the patent application US 2003/0079122 A1 discloses using a public key infrastructure (PKI).

However, a public key infrastructure is rather complex to set up because it involves co-ordination and agreements between device manufacturers and manufacturers of external security tokens. It also imposes an amount of processing load onto the external security tokens or memories.

SUMMARY OF THE INVENTION

It is an object of the invention to avoid or at least mitigate problems found in prior art.

According to a first aspect of the invention there is provided a device which comprises:

a first integrated circuitry for forming a first trust zone, the first integrated circuitry comprising a secure processor; and a second integrated circuitry separate from the first circuitry for forming a second trust zone, the second integrated circuitry comprising a secure non-volatile storage within the second trust zone, wherein the secure processor is configured to communicate information from the first trust zone to the second trust zone in a secure manner for the secure information to be securely stored in the secure non-volatile storage;

the second integrated circuitry is configured to communicate information stored in its secure non-volatile storage froth the second trust zone to the secure processor within the first trust zone in a secure manner; and wherein said first integrated circuitry and said second integrated circuitry are internal parts of the device.

In an embodiment, an internal security token or storage is provided to securely store secure information, such as information indicative of different counters. An internal security token is one that is part of the device, and can be initialised during device assembly. But the security token is not within the tamper-resistant perimeter of the secure processor. Advantageously, the internal security token is provided by the second integrated circuitry, which contains the non-volatile memory capable of maintaining the security related state information over a period of time without continuous power supply.

Advantageously, the device comprises a security information processing and storage circuitry on a common assembly module so that the communications between the first and second circuitry may not be detectable from connectors interconnecting two assembly modules.

Further, it may be economical to provide the first circuitry only with a volatile rewritable memory and thereby possibly reduce the complexity of the first circuitry whilst making use of the second circuitry that may be better suited for providing a persistent rewritable memory. For instance, present digital integrated circuit (IC) blocks may not be economically adapted to provide a flash memory whilst analog circuitry such as an energy management chip may be relatively simply adapted to provide a persistent storage with little cost. This is particularly convenient in case of products manufactured in tens or hundreds of millions such as mobile telephones.

Advantageously, the first and second circuitries are adapted to establish a secure communication protocol to be used between the first and second trust zones. The protocol contains at least READ and WRITE commands and key-change operations, e.g., a WRITE KEY command. Accordingly, in an embodiment the device is provided with key-state management enabling more than one key to be shared between the first and second trust zones. The non-volatile storage of the second trust zone may comprise at least one key-state variable indicating the shared key to be used in communication. The state variable is maintained and updated when a key shared between the first and second trust zones is changed.

An embodiment of the invention provides a freshness check for READ and WRITE operations. For READ operations: the secure processor may include a random value as a parameter in a READ command so that it can verify that a subsequent result received from the second integrated circuitry is fresh, that is, not replayed. For WRITE operations: the freshness may be performed by including the old value in a target cell as a parameter in the WRITE command, and by checking, in the second integrated circuitry, whether this parameter in the WRITE command is the same as the old value in the target cell. If it is not, the WRITE command will not be permitted.

In yet another embodiment, the second integrated circuitry is adapted to use only a single cryptographic primitive for all of its cryptographic operation.

According to a second aspect of the invention there is provided a method for initializing a secure key to be shared between a first integrated circuitry and a second integrated circuitry, the method comprising:

distributing the secure key to be shared between the first integrated circuitry and the second integrated circuitry from a secure key-distribution server to the first and second integrated circuitry, wherein the method comprises:

protecting the distribution of the secure key from the secure key-distribution server to the first integrated circuitry using a first key, the first key being a key shared beforehand between the first integrated circuitry and the secure key-distribution server; and protecting the distribution of the secure key from the secure key-distribution server to the second integrated circuitry using a second key, the second key being a key shared beforehand between the second integrated circuitry and the secure key-distribution server.

According to a third aspect of the invention there is provided an integrated circuitry, which comprises:

a secure processor for issuing and encrypting commands to be transferred to another integrated circuitry in accordance with a secure protocol, wherein the secure protocol comprises a key-change operation by which a secure key shared between the integrated circuitry and said another integrated circuitry can be changed.

According to a fourth aspect of the invention there is provided a computer program executable by a secure processor of an integrated circuitry, comprising:

program code for issuing commands to be transferred to another integrated circuitry in accordance with a secure protocol; and program code for causing the secure processor to initiate a key-change operation by which a secure key shared between the integrated circuitry and said another integrated circuitry is changed.

According to a fifth aspect of the invention there is provided an integrated circuitry, which comprises:

a non-volatile memory for storing secure data received from another integrated circuitry; and logics for accessing said non-volatile memory, wherein the integrated circuitry is adapted to communicate secure data stored on said non-volatile memory and secured by means of cryptography to said another integrated circuitry, and wherein the integrated circuitry is configured to use a single cryptographic primitive.

According to a sixth aspect of the invention there is provided a computer program executable in an integrated circuitry, comprising:

program code for securing communications with another integrated circuitry by using a key shared between the integrated circuitry and said another integrated circuitry; and program code for changing between different key-states of different security levels.

According to a seventh aspect of the invention there is provided an energy management chip adapted to carry out energy management of a device, the energy management chip comprising a secure non-volatile memory and logics so as to provide a security token for a secure processor.

The computer program according to the fourth and/or sixth aspect of the present invention may be stored on a computer readable media. The computer program according to the fourth and/or sixth aspect of the present invention may be carried by an information signal.

Advantageously, the operation of the processor and/or the logics of the second integrated circuitry may be programmed by means of computer program written into a memory from which the program is subsequently executed to control the operation of a respective device. Advantageously, the program may be only written during production process of a device comprising the processor and the logics. Alternatively, the program may be stored on configuring a device comprising the processor and the logics for its normal use. The storing on configuration may be performed in connection of service or end-use.

According to yet another aspect of the invention there is provided a first integrated circuitry in line with the first aspect of the invention. The first integrated circuitry is configured to operate with a second integrated circuitry as an internal part of a device. According to yet another aspect of the invention there is provided a second integrated circuitry in line with the first aspect of the invention. The second integrated circuitry is configured to operate with a first integrated circuitry as an internal part of a device.

Dependent claims relate to embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawings in which.

DETAILED DESCRIPTION

An embodiment of the invention is designed to enable a secure processor to securely store state information on an internal security token. The term internal security token herein means a security token internal to a device in contrast to the security tokens external to the device (such as removable smart cards) known from the prior art. However, although the internal security token forms part of the device, that is, it is substantially irreplaceable, the internal security token is not integrated to the secure processor. In other words, this embodiment of the invention presents a security token or storage which is internal (to the device) but not integrated (to the secure processor).

Figure 1:
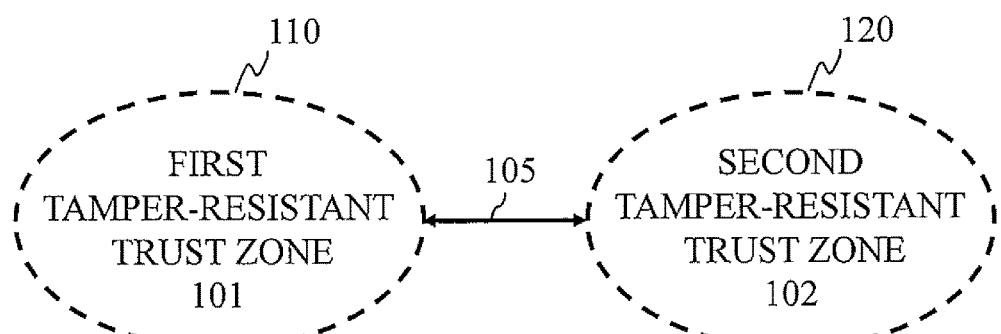
FIG. 1 shows the idea of having two separate trust zones inside a device according to an embodiment of the invention.

FIG. 1 shows a first trust zone 101 limited by a first trust perimeter 110. The secure processor lies inside the first trust perimeter. The zone inside the first trust perimeter is tamper-resistant. The internal security token is not inside the first trust perimeter, but a second trust zone 102 limited by a second trust perimeter 120 is arranged inside the device and the internal security token is implemented there. Also the second trust zone is tamper-resistant.

The second trust zone 102 is separate from the first trust zone 101. The secure processor of the first trust zone communicates with the internal security token via a communication channel 105 implemented between the first trust zone and the second trust zone. Accordingly, two permanent and separate tamper-resistant trust zones joined by a communication channel are implemented in the device.

An example of a secure processor is a secure baseband ASIC chip on a mobile station, such as a mobile phone of a cellular network. A corresponding example of an internal security token is a separate integrated circuit (IC) chip, for instance, an energy management chip. An example of the communication channel is an I²C bus.

Hand-held, portable devices, such as mobile phones are typically manufactured by putting together a set of assembly modules. In accordance with an advantageous implementation, the chip (or circuitry) comprising the secure processor, the inter-connecting communication channel and the separate chip (or circuitry) comprising the internal security token belong to a common assembly module. They can be implemented on a common circuit board. Alternatively, they may belong to different assembly modules, connected together via the communication channel.

Figure 2:
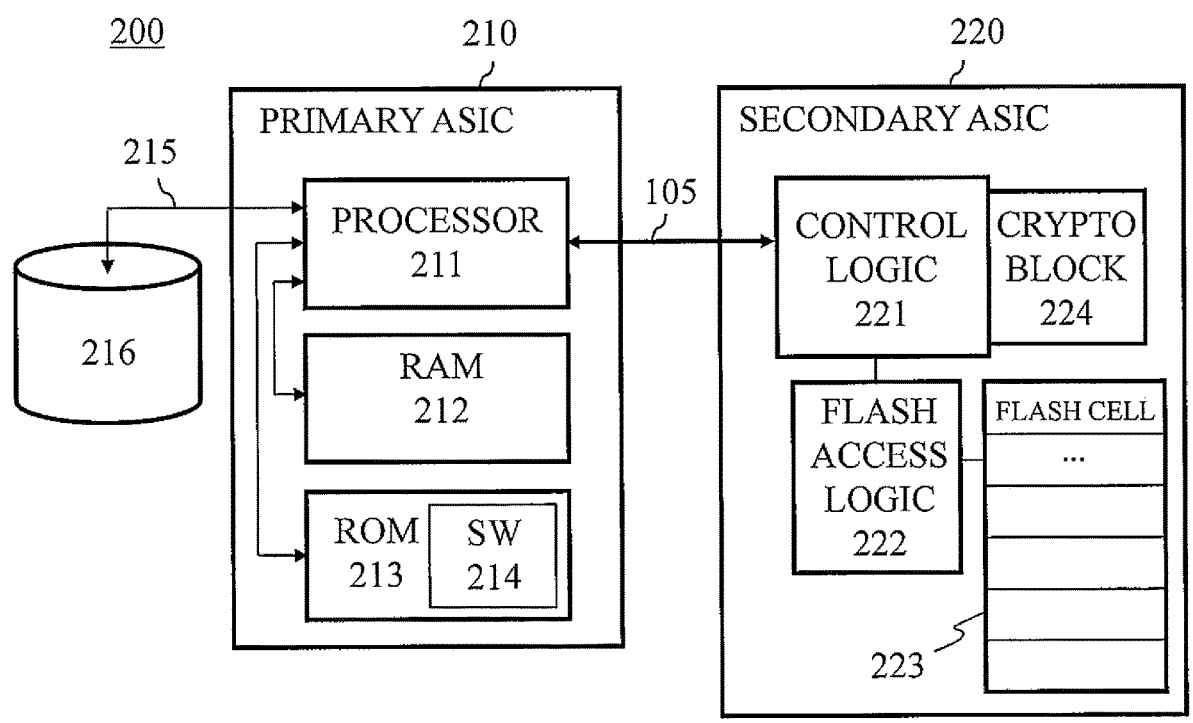
FIG. 2 shows a simplified block diagram of a mobile phone assembly module according to an embodiment of the invention.

FIG. 2 presents a simplified block diagram of a mobile phone assembly module 200 according to an embodiment of the invention. The assembly module 200 is a circuit board or other integral entity comprising two or more IC blocks. The IC blocks are referred here as integrated IC chips regardless whether they actually contain any silicon chips.

The assembly module 200 comprises two particular IC chips: a primary ASIC 210 and a secondary ASIC 220, wherein the secondary ASIC 220 provides the primary ASIC 210 with a security token. The primary ASIC 210 may be the secure baseband ASIC, a digital IC chip capable of baseband frequency operation, and the secondary ASIC may be the energy management chip (also known as EMC), an analog IC chip capable of energy management.

The primary ASIC 210 comprises a secure processor 211, a secure Random Access Memory 212 such as a Layer 1 cache and a non-volatile read-only memory 213 (ROM). The ROM 213 contains part of the computer program code 214 for controlling the operation of the secure processor 211 when loaded after device start-up. The primary ASIC 210 is connected to another non-volatile memory 216 via a memory bus 215. The non-volatile memory 216 forms a protected storage on an insecure (non-tamper-resistant) zone outside the first trust zone. Accordingly, the secure processor has rewriteable non-volatile memory only on the outside of the first trust zone. The protected storage 216 is secret because its information is encrypted using an internal key known inside the first trust perimeter. However, the protected storage is not integrity protected, since the information contained in it can be replaced, at least in principle, by a sophisticated attacker.

The secondary ASIC 220 contains a rewriteable non-volatile memory such as a flash memory 223. The secondary ASIC 220 further comprises flash memory access logic 222 for accessing the flash memory, control logic 221 for carrying out communication with the primary ASIC 210, and a crypto block 224 coupled to the control logic 221 for performing cryptographic primitives. If the secondary ASIC 220 is the energy management chip of a cellular phone, the secondary ASIC 220 additionally comprises other appropriate blocks needed for carrying out normal energy management functions. These functions involve controlling the energy supply for components with a voltage higher than that controllable by digital circuitry of a typical cellular phone. The logic blocks 221 and 222 and the crypto block 224 may be implemented by hardware, software or a combination of hardware and software.

It should be appreciated that it is not necessary to implement the secondary ASIC 220 on an analog chip. To the contrary, a digital IC integrated in the assembly 200 with a rewriteable persistent memory would be equally usable. Moreover, the embodiments of the invention are equally applicable with IC blocks of other type.

The primary ASIC 210 can be any suitable IC capable of running computer program code so that it is difficult to intervene to its execution when it runs applications inside the first trust perimeter 110, that is, on the first tamper-resistant trust zone 101. The trust zone 101 contains the necessary registers and memory areas that generally contain secured data. The secondary ASIC 220 has the second trust zone 102 containing the logic circuitries 221 and 222, the crypto block 224 and relevant portions, if not all, of the rewriteable non-volatile or persistent memory 223. The logic circuitry 222 advantageously provides the only—and controlled—access to the relevant portions of the persistent memory 223. Not all of the persistent memory 223 has to be within secure perimeter 120. However, typically this would be the case.

The control logic circuitry 221 is capable of secure communications with the secure processor 211 by cryptographic means provided by the crypto block 224. The secure communications is achieved by protecting the communication channel 105 cryptographically by using a key. The present invention provides the secondary ASIC with different key-state values. What key is used for securing the communication channel depends on the current key-state the secondary ASIC 220 is in. Depending on the key-state a hardwired key K_H, a group key K_G or a dedicated key K_S is used. It should be noted, however, that although the communications occurring via the communication channel 105 is secured, the communication channel itself is not within any of the mentioned trust perimeters but lies, in that sense, on an unprotected zone. The same applies to the protected storage 216.

The primary ASIC 210 and the secondary ASIC 220 are initialised to work together as a secure pair in an initialisation procedure. During chip manufacture, the global hardwired key K_H is encoded (or burned) within the control logic 221 of the secondary ASIC 220, and an identifier ID_S is assigned to the chip. The identifier ID_S is a unique identifier uniquely identifying the secondary ASIC 220. Alternatively, the identifier ID_S is a group identifier. In a subsequent step, a group key K_G is set (or written) to the secondary ASIC. The group key is by definition a key specific to a group, e.g., a batch of chips. When the group key K_G is set, the secondary ASIC is switched from the key-state in which it uses the hardwired key K_H for encryption ("hardwired key state") to the key-state in which the group key K_G is used for encryption ("group key state"). Advantageously, the setting of the group key K_G and the related switch from "hardwired key state" to "group key state" is carried out when the chip is manufactured.

The dedicated key K_S is advantageously not set to the secondary ASIC during the chip manufacture, but only later when the assembly module 200 is put together or when the device containing the assembly module 200 is put together in a phone factory assembly line. This part of the initialisation can also take place at a service point.

Figure 3:
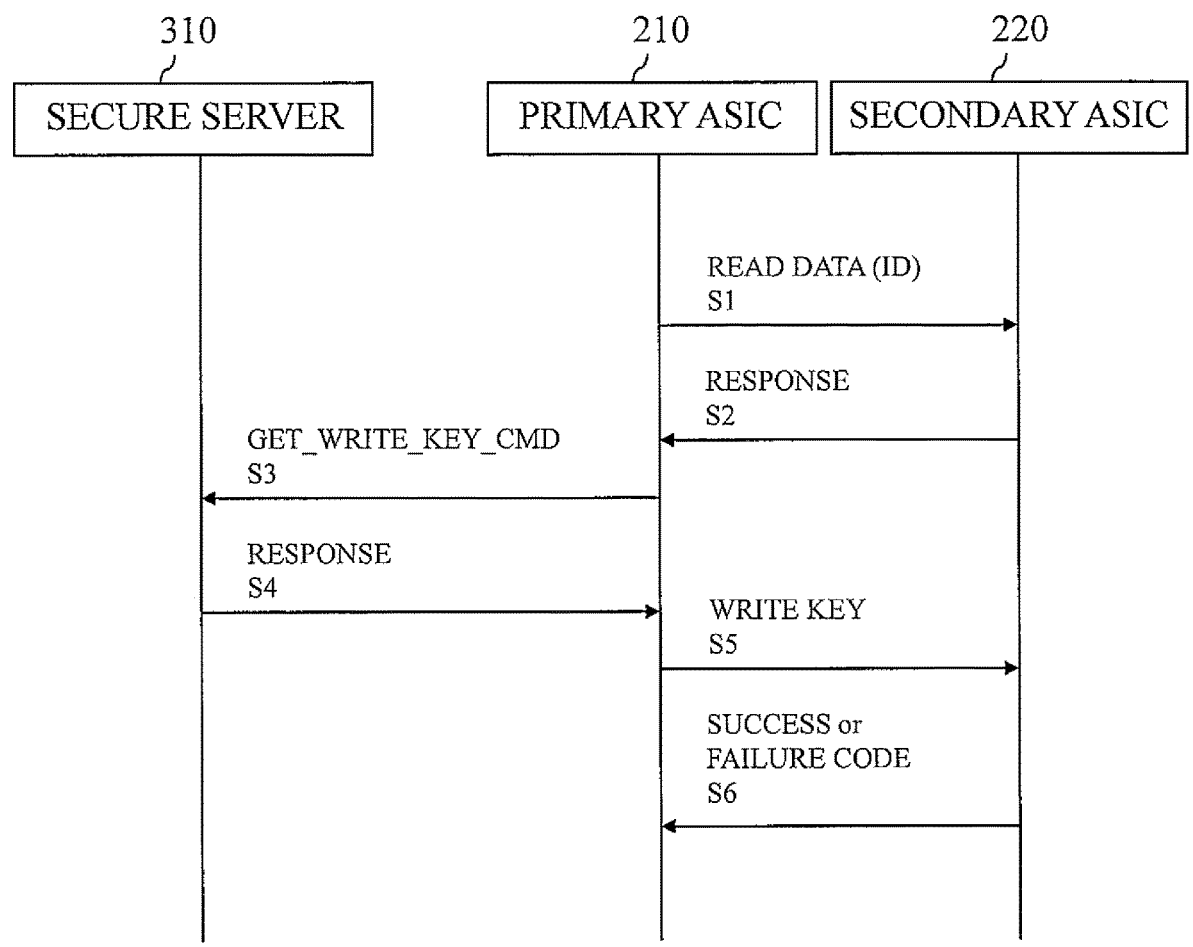
FIG. 3 shows an initialisation procedure in accordance with an embodiment of the invention.

FIG. 3 shows an initialisation procedure according to an embodiment of the invention. The purpose of the initialisation procedure of FIG. 3 is to assign a shared key or secret, that is, the dedicated key K_S to the secure processor of the primary ASIC 210 and to its security token, i.e., the secondary ASIC 220. A secure server 310 in the assembly line acts as a key distribution server.

In step S1 the primary ASIC 210 reads the identification information of the secondary ASIC 220. As a response (step S2) it gets the identifier ID_S of the secondary ASIC 220. Optionally, the primary ASIC 210 may also read the current key-state information from the secondary ASIC 220. In step S3 the primary. ASIC 210 requests from the secure server 310 the dedicated key K_S to be shared between the ASICs 210 and 220. This request advantageously contains the key-state of the secondary ASIC 220, the identifier ID_S of the secondary ASIC 220, and an unique identifier ID_P of the primary ASIC 210. Optionally, the request may be authenticated using a key K_P, a secret key beforehand shared between the security server 310 and the primary ASIC 210. Based on received information the secure server 310 forms or selects the dedicated key K_S. The secure server 310 may have a database in which it maintains information relating to each key. For example, in this case the secure server 310 may link together the identifiers ID_P and ID_S, the key-state of the secondary ASIC 220 and the dedicated key K_S.

In step S4, the secure server 310 sends back a response to the primary ASIC 210. The response comprises two parts. The first part is the payload for a WRITE KEY command to be issued by the primary ASIC 210 to the secondary ASIC 220. It comprises the dedicated key K_S encrypted using the key K_G. The second part comprises the dedicated key K_S encrypted using the key K_P. In step S5 the dedicated key is transferred and stored to the logic of the secondary ASIC 220 by issuing a WRITE KEY command with the first part mentioned above as the payload, and the key-state of the secondary ASIC 220 is updated accordingly to "dedicated key state". Concurrently, the primary ASIC 210 also decrypts the first part and stores its copy of K_S in its protected storage 216. In step S6, a success or failure code is sent to the primary ASIC 210 in return to the WRITE KEY command. The key K_S is now ready to be used.

It should be noted that while the above describes the initialisation procedure for changing the key-state of the secondary ASIC 220 so that it switches from "group key state" to "dedicated key state", a similar procedure could optionally be used to change the key-state of the secondary ASIC 220 from "hardwired key state" to "group key state". As far as the above description is concerned, it is only needed to replace K_G by K_H and K_S by K_G. All other parts should remain the same. Going from K_H key-state to K_G key-state is advantageously performed at the time of manufacturing the secondary ASIC. But it can be done also at the phone factory. The purpose of K_G (and analogously K_H) is to protect the transfer of K_S (and analogously K_G) to the secondary ASIC. From the keys, only the key K_H is hardwired, the other keys are not hardwired but merely set by the WRITE KEY command.

As mentioned in the foregoing, the shared key K_S is used to secure the communication between the primary ASIC 210 and the secondary ASIC 220. Accordingly, in an embodiment the READ and WRITE commands, which belong to a protocol to be used between the ASICs, and which are used to read and write secure state information (such as information bound to a monotonically increasing PIN access attempt counter) on the persistent memory 223 of the secondary ASIC 220 are secured by symmetric key cryptographic algorithms, such as symmetric DES algorithm, using the dedicated key K_S. Otherwise the basic usage scenario of READ or WRITE commands corresponds to the one presented in US 2003/0079122 A1. The primary ASIC 210 sends protocol commands to the secondary ASIC 220 and the secondary ASIC 220 responds to the primary ASIC 210 by sending responses to the commands.

The data to be integrity protected is encrypted and stored in the protected non-volatile storage 216 by the secure processor 211 using K_S. This data or its critical parts is encrypted and stored also in the memory 223 of the secondary ASIC 220 using K_S. When the power is switched on, the secure processor 211 compares the contents of these memories. If, for example, the storage 216 has been tampered, this will be noticed when comparing the contents.

In the following, particular implementation issues are discussed.

Firstly, the write operations (WRITE or WRITE KEY) are not atomic. It is possible that a write operation fails. A failed write operation may cause the secondary ASIC to arrive at an indeterministic key-state. In that case, the secondary ASIC, for example, would not know which key to use. To mitigate this problem, in accordance with an embodiment of the invention, at least two separate memory locations (instead of one) on the internal security token are used to track its key-state indicating which key is being used. These memory locations contain a key-state variable indicating the key-state or the key in use. In an embodiment, redundancy is added to each key-state variable. Redundancy is added by presenting the value of a key-state variable at least partly in the form of a magic value, a value substantially longer than the "real" value. If the key-state variable has any value other than the magic value, the device is arranged to fall back to using a safer security level key (e.g., continue to use K_G if the process of updating key-state from "group key state" to "dedicated key state" encountered a WRITE failure.). Another embodiment provides means to confirm whether a WRITE operation has been succeeded or not. In this embodiment, after issuing a WRITE command, any number of READ commands is issued to verify the result of the WRITE command.

Secondly, for debugging purpose, it should be possible to reset the internal security token by returning it to a known state so that an external testing device may read and write the data on it. Naturally, this should be possible without damaging the security of the system in normal operation. To achieve this, in an embodiment, a reset operation is arranged so that it first zeros one key-state variable and then wipes out stored keys and in the internal security token so that the device is forced to use the hardwired key (or no key at all). In an embodiment, the internal security token is arranged so that whenever the device is powered up, if this key-state variable is not the magic value, keys are wiped out.

Thirdly, if the internal security token has no source of randomness inside the internal security token, this may cause difficulties as far as replay attacks are concerned. As described earlier, communications between the secure processor and the internal security token are encrypted and integrity protected. The lack of source of randomness is next discussed separately for read and write operations:

read operations: the internal security token need not necessarily do replay detection, since the secure processor can do this by including a nonce in the READ command.

write operations: replay detection would be appropriate to prevent replay attacks. In an embodiment, the secondary ASIC verifies that, in addition to a new value, the received WRITE command also includes the current value stored in the target memory location (or, in other embodiments, also values in other memory locations, or the result of applying a mutually known function to the values in some memory locations). Otherwise the WRITE operation is not permitted. This guarantees a limited-form of replay protection: as long as the sequence of values stored in the memory location has no loops, the attacker cannot attack the system by replaying an old WRITE command. In another embodiment, to reduce the chances of an attacker to determine whether a memory location has changed by replaying a READ command, the secondary ASIC is provided with a linear feedback shift register (LFSR) and some bits from the LFSR are added to a reply. The LFSR is initialized using the contents of one or more memory locations, and is driven by a clock.

In this way, it is secured for READ and WRITE commands that an observer of the communication channel 105 cannot easily determine what were the parameters communicated, or what was the effect.

Fourthly, cryptographic processing on ASICs is implemented using basic cryptographic primitives. If the secondary ASIC is resource constrained, the secure communication protocol between the ASICs should be designed in such a way that all the necessary cryptographic processing on the secondary ASIC can be done using as few cryptographic primitives as possible, but still preserving the required properties of the protocol like confidentiality and message integrity. This can be achieved, for example, as follows, using a suitable symmetric encryption algorithm like AES (Advanced Encryption Standard), DES (Data Encryption Standard), or triple DES. The symmetric encryption algorithm consists of a forward transformation (normally used for encryption) and a reverse transformation (normally used for decryption).

For messages generated in the primary ASIC and sent to the secondary ASIC:

confidentiality is achieved by using the forward transformation as the basic operation in Cipher-Block Chaining (CBC) mode; and integrity is achieved by using CBC MAC (message authentication code), but using reverse transformation as the basic operation in CBC mode.

The CBC mode is a mode of operation generally known to a person skilled in the art and more closely discussed, for example, in the book of "*Handbook of Applied Cryptography*" by Alfred J. Menezes et al., ISBN: 0-8493-8523-7, Fifth Printing, August 2001.

For messages generated in the secondary ASIC and sent from the secondary ASIC:

confidentiality is achieved by using the reverse transformation; and integrity is achieved by using CBC MAC with the reverse transformation as the basic operation.

This way, the secondary ASIC needs to only implement the reverse transformation of the symmetric encryption primitive. The primary ASIC needs to implement both forward and reverse transformation.

When the symmetric encryption algorithm is triple-DES, then three reverse transformations of the basic DES algorithm are used in sequence in the secondary ASIC. This way, the secondary ASIC needs to only implement the reverse transformation of DES.

If the message sent from the secondary ASIC is only one block size long, then no chaining is necessary.

Figure 4:
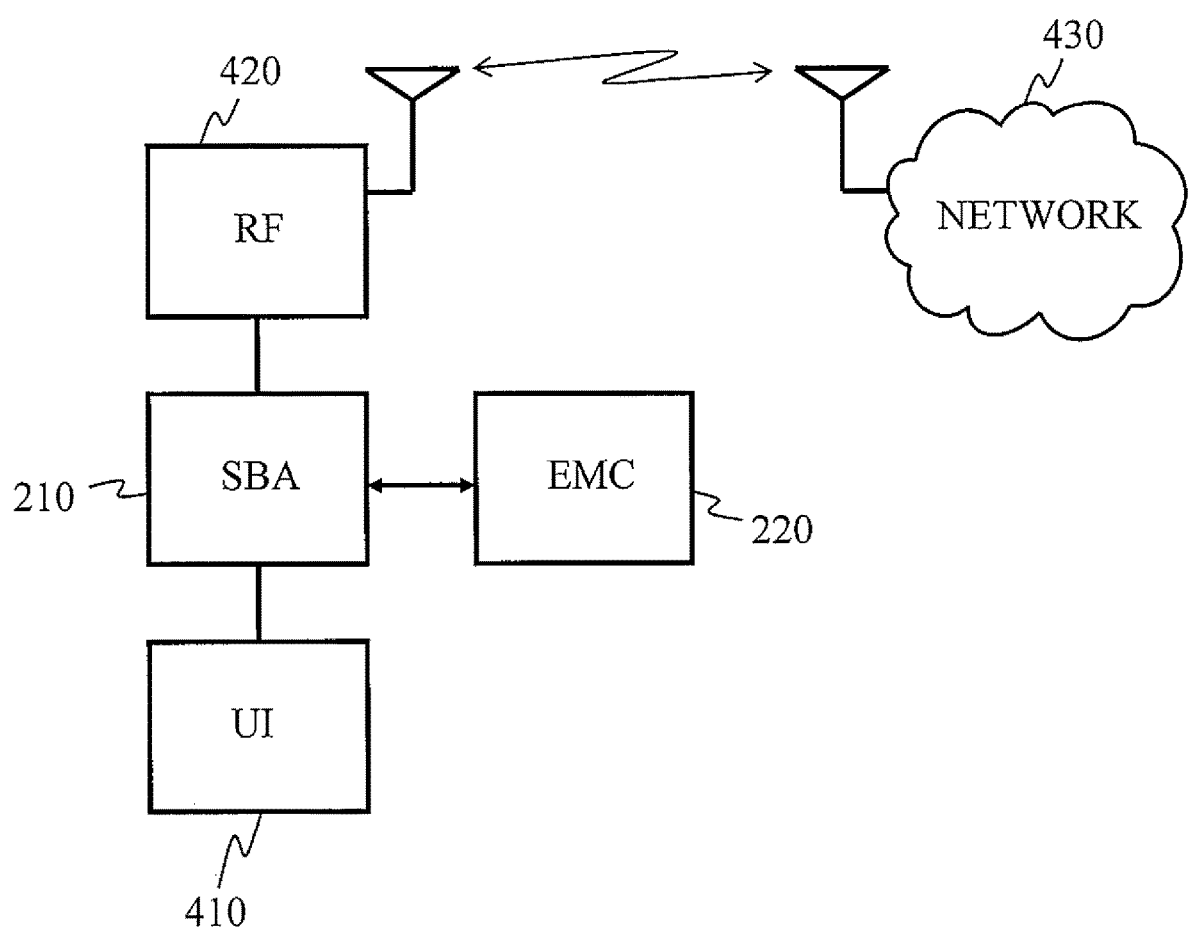
FIG. 4 shows a mobile station of a cellular communication network in accordance with an embodiment of the invention.

FIG. 4 shows a very simplified illustration of a mobile station of a cellular communication network in accordance with an embodiment of the invention. The mobile station 400 comprises, in addition to the secure baseband ASIC 210, the energy management chip 220 and the I$^2$C bus 105, a user interface 410 and a radio frequency (RF) part 420. The user interface 410 and the radio frequency part 420 are coupled to the baseband ASIC 210. The user interface comprises a keyboard and display for using the device. The keyboard can be used, for example, for inputting a PIN to the device. According to PIN attempts, the secure baseband ASIC 210 maintains state information (here: number of unsuccessful PIN attempts) in the non-volatile memory of the energy management chip 220. The RF part is used for wireless radio frequency communication with the wireless network 430.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. A number of features were described as part of examples in the foregoing and wherever technically possible, the features should be regarded as optional and combinable with any different other examples of the description. For instance, the invention is useful also in various electronic devices, particularly in portable electronic books, PDA devices, gaming devices, music players, DRM enabled set-top boxes capable of providing limited access to (rented) content and GPS positioning devices. Hence, the scope of the invention is only restricted by the attached patent claims.

The invention claimed is:

1. An apparatus, comprising:
  a first trust zone inside the apparatus, the first trust zone comprising a secure processor;
  a second trust zone inside the same apparatus, the second trust zone comprising a secure non-volatile storage;
  and a communication channel between the first trust zone and the second trust zone, wherein a portion of the communication channel is not within the first trust zone or the second trust zone, wherein the communication channel is protected with a pre-provisioned key, wherein the pre-provisioned key comprises a shared key configured to be formed based on a unique identifier of the first trust zone and a unique identifier of the second trust zone,
  wherein the secure processor is configured to communicate information from the first trust zone to the second trust zone in a secure manner via the communication channel with use of the pre-provisioned key, wherein the second trust zone is configured to communicate information, stored in a secure non-volatile storage of the second trust zone, from the second trust zone to the secure processor within the first trust zone in a secure manner via the communication channel with use of the pre-provisioned key, and wherein the secure processor is configured to include a random value as a parameter in a command so that the secure processor can verify that a subsequent result received from the second trust zone is fresh and not replayed; and wherein pre-provisioned features of the pre-provisioned key are provided when the apparatus is manufactured.

2. The apparatus of claim 1 wherein the portion of the communication channel lies in a zone separate from the first and second trust zones.

3. The apparatus of claim 1 wherein the second trust zone comprises control logic connected to the secure non-volatile storage.

4. The apparatus of claim 1 wherein the first trust zone is configured to have access to a protected storage located outside of the first trust zone.

5. The apparatus of claim 4 wherein data stored in the protected storage is encrypted with a key known only by the first trust zone.

6. The apparatus of claim 4 wherein the apparatus is configured to compare contents of the protected storage with contents of the secure non-volatile storage of the second trust zone.

7. The apparatus of claim 1 wherein the secure processor comprises at least one memory that contains executable instructions that if executed by the processor cause the apparatus to change between different key-states of different security levels.

8. The apparatus of claim 1 wherein the apparatus is a mobile phone.

9. An apparatus, comprising:
a first trust zone inside the apparatus, wherein the first trust zone is on a first integrated circuit;
a second trust zone inside the same apparatus, wherein the second trust zone is on a second integrated circuit;
and a communication channel between the first trust zone and the second trust zone, wherein the communication channel is protected via a pre-provisioned key, wherein the pre-provisioned key comprises a shared key configured to be formed based on a unique identifier of the first trust zone and a unique identifier of the second trust zone, where the first integrated circuit is configured to cause communication of information from the first trust zone to the second trust zone in a secure manner via the communication channel with use of the pre-provisioned key, and where the second integrated circuit is configured to cause communication of information from the second trust zone to the first trust zone in a secure manner via the communication channel with use of the pre-provisioned key;

wherein pre-provisioned features of the pre-provisioned key are provided when the apparatus is manufactured; and wherein the first trust zone is configured to have access to a protected storage located outside of the first trust zone, wherein data stored in the protected storage is encrypted with a key known only by the first trust zone, and wherein the secure processor is configured to include a random value as a parameter in a command so that the secure processor can verify that a subsequent result received from the second trust zone is fresh and not replayed.

10. The apparatus of claim 9 wherein the first integrated circuit comprises a secure processor.

11. The apparatus of claim 9 wherein the second integrated circuit comprising a secure non-volatile storage.

12. The apparatus of claim 9 wherein a portion of the communication channel lies in a zone separate from the first and second trust zones.

13. The apparatus of claim 9 wherein the apparatus is configured to compare contents of the protected storage with contents of the secure non-volatile storage of the second trust zone.

14. The apparatus of claim 9 further comprising a processor and at least one memory that contains executable instructions that if executed by the processor cause the apparatus to change between different key-states of different security levels.

15. The apparatus of claim 1 wherein a unique identifier of a primary application-specific integrated circuit (ASIC) is also used in forming of the key.

16. The apparatus of claim 1 wherein a secure channel is based on using the pre-provisioned key in AES (Advanced Encryption Standard) algorithm for both encryption and integrity protection of transmitted messages.

17. The apparatus of claim 9 wherein a unique identifier of a primary application-specific integrated circuit (ASIC) is also used in forming of the key.

18. The apparatus of claim 9 wherein a secure channel is based on using the pre-provisioned key in AES (Advanced Encryption Standard) algorithm for both encryption and integrity protection of transmitted messages.

* * * * *